United States Patent [19]
Sebillotte et al.

[11] Patent Number: 5,581,437
[45] Date of Patent: Dec. 3, 1996

[54] POWER CAPACITOR

[75] Inventors: Eric Sebillotte, Epagny; Serge Theoleyre, Aix-Les-Baines, both of France

[73] Assignee: Schneider Electric SA, France

[21] Appl. No.: 340,862

[22] Filed: Nov. 15, 1994

[30] Foreign Application Priority Data

Nov. 30, 1993 [FR] France ................... 9314431

[51] Int. Cl.[6] .................. H01G 4/08; H01G 4/02
[52] U.S. Cl. .......... 361/323; 361/326; 361/301.5; 361/307
[58] Field of Search ..................... 361/320, 323, 361/322, 315, 313, 307, 301.3, 326; 29/25.42

[56] References Cited

FOREIGN PATENT DOCUMENTS 3337938  8/1984  Germany.
4302420  3/1994  Germany.

Primary Examiner—Leo P. Picard
Assistant Examiner—Anthony Dinkins
Attorney, Agent, or Firm—Parkhurst, Wendel & Burr, L.L.P.

[57] ABSTRACT

A power capacitor including at least one capacitive winding, of self-healing type, located in a case made of plastic material and coated in a polymerizable resin cast directly into the case. The capacitor includes a breaking device sensitive to an overpressure. Passage of gases in the direction of the breaking device is achieved by deformation of the plastic material constituting the case. The plastic material of the case presents predetermined mechanical strength, impact strength and thermal resistance characteristics.

7 Claims, 1 Drawing Sheet

POWER CAPACITOR

BACKGROUND OF THE INVENTION

The invention relates to a power capacitor comprising an overpressure device, sensitive to a gas release, and at least one capacitive winding coated in a polymerizable resin cast in a case.

A low-voltage electrical power capacitor is generally made up from capacitive windings formed by a coil of metallized dielectric films. In a self-healing capacitor, in the event of an internal fault resulting in perforation of the insulator, the energy dissipated instantaneously vaporizes the metallic deposit at the place where the perforation occurred. This re-establishes the insulation at this place and thus removes the fault.

In order to protect the metallic layer from aggressions of the surrounding environment, the coils are sunk in a polymerizable resin. To achieve this, one or more windings are placed in a case whose internal dimensions are greater than those of the winding, and a polymerizable resin is cast in the free space between the winding and the case.

In certain cases, notably in the event of overloads, voltage surges, or at the end of the life of the coil, self-healing does not take place. With the fault zone in the dielectric film no longer being electrically insulated, a fault in the coil develops very quickly. The heat given off is such that melting of the dielectric film occurs, followed by boiling, thereby creating a large volume of gas. Thus internal pressure in the case increases.

French Patent 2,174,904 corresponding to U.S. Pat. No. 3,831,070, uses the gas produced in the event of a voltage surge to create pressure which increases the threshold of non self-healing discharge occurrence. For this purpose a plastic resin, polymerizing slowly and impermeable to gases, is cast directly into a case made of plastic material. It is thus possible to increase the voltage that can be withstood by the capacitor.

The patent, however, does not disclose avoiding the risk of explosion of the capacitor, especially at the end of the life of the capacitor.

To avoid the case containing the capacitive winding from exploding, it is known to electrically disconnect the coil as soon as the internal pressure exceeds a certain limit fixed by the mechanical strength of the case. For this purpose, the pressure of the gas is used to actuate a mechanical system called a booster to enable the electrical power supply to the coil to be broken or short-circuited. In known devices the gas pass through the resin coating the coil and must to be routed to reach the booster.

A difficulty, however, lies in obtaining a reliable and efficient routing whatever the pressure increase kinetics. In fact, depending on how the fault in the coil develops, a very fast pressure increase can occur akin to an explosion, or little amount of gas be emitted, but a large amount of dielectric material may be melted. In the latter case a path is required which can withstand the high temperature of the melted dielectric for several minutes, the time for the pressure to reach the value necessary for the booster to operate. To overcome this difficulty, several solutions exist at present, with their advantages and drawbacks.

In certain cases the capacitor case is metallic, such as made of aluminium. The case therefore withstands temperature and is uninflammable. The malleability of the material enables a booster to be obtained at little cost, by making one or more extendible folds in the upper part of the case. A large drawback of the metal case is that it is electrically conducting. This requires electrical insulation between the case and the coil and electrical connections. This insulation is generally achieved by an internal envelope made of plastic material. In addition, a free space is generally left between this envelope and the case for routing of the gases. Moreover, the capacitor case must be connected to the ground circuit of the electrical installation.

In the document EP-A-11,347 corresponding to U.S. Pat. No. 4,283,750, the aluminium case is provided with an extendible fold, an auxiliary part made of polyamide, which adheres only slightly to resin, being disposed in the case between the extendible fold and the base-plate of the case, and acting as a securing support for one of the electrical connections of the capacitor.

Capacitors also exist whose case is made of plastic. In this case, no problem of electrical insulation arises. A drawback of the plastic case is that, on account of its low temperature withstand, a space must be arranged between the resin and the internal face of the case for routing of the gases and molten dielectric material. This space can be achieved by covering the internal face of the case with a low-density closed-cell foam. The hot gases melt this foam thereby creating an easy path to the booster. The coil coated with resin can also be arranged in an intermediate envelope made of easily meltable plastic material. The external face of this envelope comprises, for example, fins which extend in the free space between the intermediate envelope and the internal face of the case. Another drawback of plastic materials is their inflammability.

Thus, in the state of the art of the technology, whatever the material of the case, the measures taken for routing the gas complicate manufacture of the power capacitor and lead to an increased volume of the capacitor, whether it involves leaving inside the case, generally on its internal face, a free space or a provisionally closed space. These two drawbacks have a non-negligible impact in terms of manufacturing cost.

SUMMARY OF THE INVENTION

The object of the present invention is to achieve a capacitor overcoming the above-mentioned drawbacks.

A power capacitor according to the invention comprises a case made of plastic material. The capacitive winding or windings are arranged in the case and a polymerizable resin, designed to coat the winding or windings, is cast directly into the case, without an intermediate operation being required. It is not necessary to provide a space between the coating resin and the internal face of the case for the gases to pass to a breaking device in the event of overpressure.

To achieve this, the case is made of a plastic material having mechanical and temperature withstand properties enabling it to withstand the mechanical and temperature increase stresses due to the flow of the gases and molten dielectric material, whatever the pressure increase kinetics inside the case.

DESCRIPTION OF THE PREFERRED EMBODIMENTS

Figure 1:
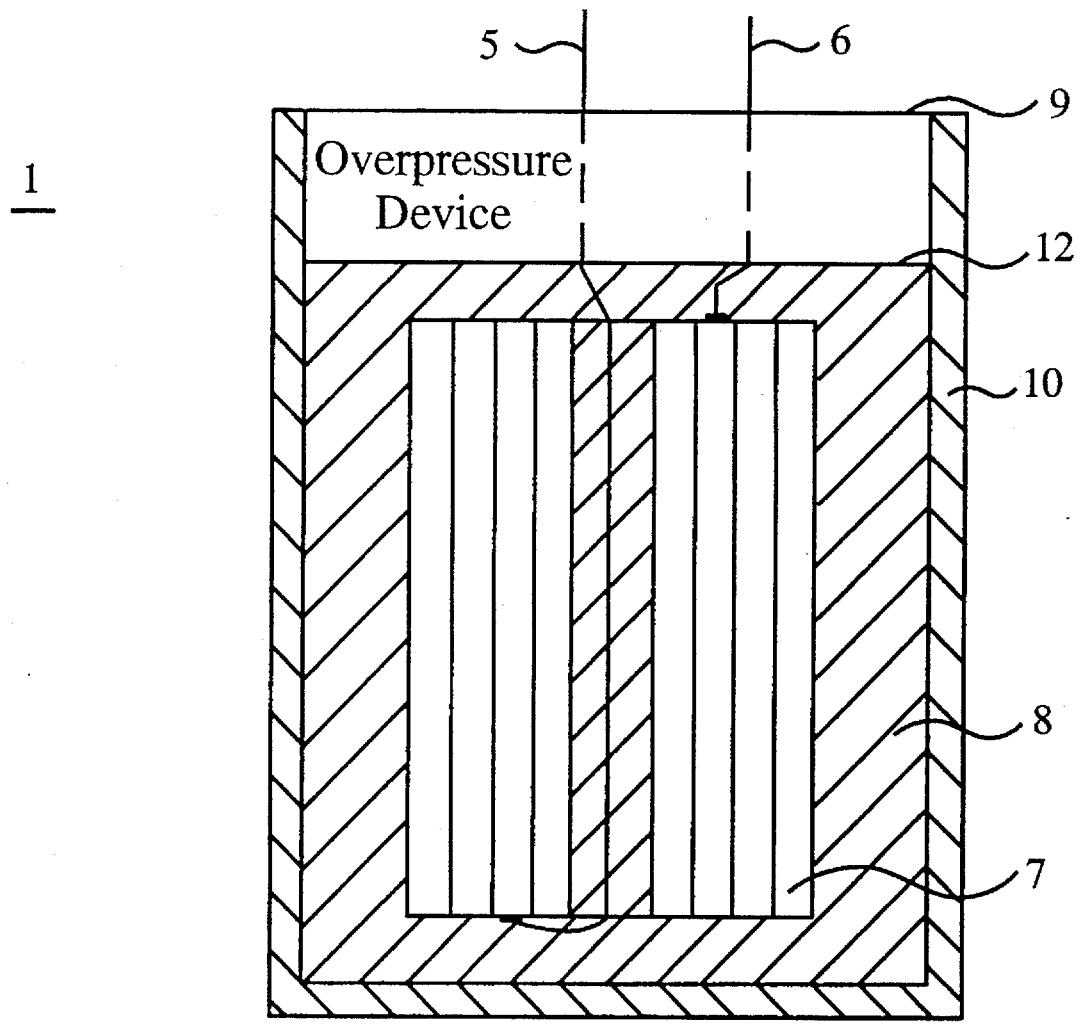
FIG. 1 shows a capacitor having an overpressure device and a plastic case in accordance with the present invention.

The present invention is directed to a power capacitor 1 comprising a plastic casing 10 having one open side 12.

Inside the casing 10 there is housed a coil 7 formed by a winding of metalized plastic films. Connecting wires 5,6 connected to opposite electrodes of the coil 7 lead out of open side 12. Polymerizable resin 8 is cast in the free space between coil 7 and casing 10. Overpressure device 9 seals the open side 12 of the casing 10 and permits connecting wires 5, 6 to penetrate therethrough. According to the present invention, the aforementioned object is achieved by choosing a plastic material which simultaneously possesses the following properties:

A mechanical strength such that, measured by a tensile test carried out on a test bar and according to an operating mode in compliance with the ISO 527 standard with an elongation rate of the bar of 50 mm per minute, at 23° C., the tensile stress at the elastic limit is comprised between 60 and 80 Mpa, the relative elongation at the elastic limit is comprised between 4 and 10%, the tensile breaking strength is comprised between 50 and 80 Mpa, and the breaking elongation is greater than 5%.

An impact strength characterized on the one hand, according to an IZOD test carried out on a notched test bar and according to an operating mode in compliance with the ISO 180-1A standard at a temperature of 23° C., by an absorbed energy greater than 17 kJ/m$^2$, and on the other hand characterized, according to a CHARPY test carried out on a notched test bar and according to an operating mode in compliance with the ISO 179 standard, by an absorbed energy greater than 15 kJ/m$^2$.

A thermal resistance characterized on the one hand, according to a VICAT B test, where the force applied is 50N, carried out on a test bar and according to an operating mode in compliance with the ISO 306 standard, for a temperature increase rate of 50° C. per hour, by a point called VICAT B 50 greater than 140° C., and characterized on the other hand, according to an HDT (Heat Deflection Temperature) test carried out on a test bar and according to an operating mode in compliance with the ISO 75 standard, under an applied stress of 1.8 Mpa, by a temperature called HDT/A greater than 120° C.

Such a material deforms in the case of overpressure, thus enabling the gases to be routed along the slightly dilated internal wall of the case.

According to a development of the invention, the plastic material used preferably has uninflammability and self-extinguishing properties such that, measured according to the UL 94 standard, the material is classified 5 VA over a thickness of 2 mm.

Obtaining the above properties simultaneously for a plastic material is not easy. However, certain polymers meet this definition.

These polymers belong notably to the following families:

Polyphenylene oxide (PPO), also called polyphenylene ether (PPE). Polyphenylene oxide (PPO) can be modified. It can for example advantageously contain in a mixture or an alloy fractions of polyamide (PA) and/or polystyrene (PS) and/or butadiene (B) and/or styrene-butadiene (S/B).

Polycarbonate (PC) alone, or which can also advantageously contain in an alloy or a mixture fractions of acrylonitrile-butadiene-styrene (ABS).

As a non-restrictive example, a particular embodiment of the invention comprises a cylindrical capacitor case, having a wall 2 mm thick and a base-plate 3 mm thick, made from a plastic material of the "NORYL VO 150B" type developed and marketed by GENERAL ELECTRIC PLASTICS.

The material used is a polyphenylene oxide (PPO) modified by an addition of polystyrene (PS). It fulfils all the conditions set out above. Under the test conditions set out above it has the following characteristics:

In tensile testing, the stress at the elastic limit is 65 Mpa for an elongation of 4%, and a breaking strength of 55 Mpa and an elongation of 5.5%.

The IZOD impact strength on a notched test bar is 18 kJ/m$^2$, and the CHARPY impact strength on a notched test bar is 16 kJ/m$^2$.

A thermal resistance characterized by a VICAT B 50 point of 145° C. and an HDT/A temperature of 125° C.

A self-extinguishing capacity classified 5 VA over 2 mm according to the UL 94 standard.

We claim:

1. A power capacitor comprising an overpressure device, sensitive to gas release, for disconnecting a capacitive winding of said capacitor when the overpressure exceeds a given threshold, and at least one capacitive winding coated in a polymerizable resin cast in a case, said case comprising plastic material having, in combination, the following properties:

a) a mechanical strength such that, when measured by a tensile test carried out on a test bar and according to an operating mode in compliance with the ISO 527 standard with an elongation rate of the bar of 50 mm per minute, at 23° C., the tensile stress at the elastic limit is between 60 and 80 Mpa, the relative elongation at the elastic limit is between 4 and 10%, the tensile breaking strength is between 50 and 80 Mpa, and the breaking elongation is greater than 5%;

b) an impact strength, according to an IZOD test carried out on a notched test bar and according to an operating mode in compliance with the ISO 180-1A standard, at a temperature of 23° C., characterized by an absorbed energy greater than 17 kJ/m$^2$;

c) an impact strength, according to a CHARPY test carried out on a notched test bar and according to an operating mode in compliance with the ISO 179 standard, characterized by an absorbed energy greater than 15 kJ/m$^2$;

d) a thermal resistance, according to a VICAT B test, where the force applied is 50N, carried out on a test bar and according to an operating mode in compliance with the ISO 306 standard, for a temperature increase rate of 50° C. per hour, characterized by a point called VICAT B 50 greater than 140° C.; and e) a thermal resistance, according to an HDT test carried out on a test bar and according to an operating mode in compliance with the ISO 75 standard, under an applied stress of 1.8 Mpa, characterized by a temperature called HDT/A greater than 120° C.

2. The capacitor according to claim 1, wherein the plastic material used has uninflammability and self-extinguishing properties such that, measured in accordance with the UL 94 standard, the material is classified 5 VA over a thickness of 2 mm.

3. The capacitor according to claim 1, wherein the plastic material is a polyphenylene oxide.

4. The capacitor according to claim 3, wherein the plastic material is a modified polyphenylene oxide.

5. The capacitor according to claim 4, wherein the plastic material is a polyphenylene oxide modified by incorporating therein, by mixture or alloying, fractions of polyamide and/or polystyrene and/or butadiene and/or styrene-butadiene.

6. The capacitor according to claim 1, wherein the plastic material is a polycarbonate.

7. The capacitor according to claim 6, wherein the plastic material is a polycarbonate comprising in an alloy or a mixture fractions of acrylonitrile -butadiene -styrene.

* * * * *